(12) United States Patent
Kim

(10) Patent No.: US 12,434,521 B2
(45) Date of Patent: Oct. 7, 2025

(54) SUSPENSION FOR VEHICLE

(71) Applicant: HYUNDAI MOBIS CO., LTD., Seoul (KR)

(72) Inventor: Young Ha Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/930,476

(22) Filed: Oct. 29, 2024

(65) Prior Publication Data
US 2025/0262902 A1 Aug. 21, 2025

(30) Foreign Application Priority Data
Feb. 21, 2024 (KR) .......... 10-2024-0025359

(51) Int. Cl.
*B60G 11/24* (2006.01)
*B60G 7/00* (2006.01)
(52) U.S. Cl.
CPC .............. *B60G 11/24* (2013.01); *B60G 7/001* (2013.01); *B60G 7/008* (2013.01); *B60G 2202/14* (2013.01); *B60G 2206/7101* (2013.01); *B60G 2206/72* (2013.01)

(58) Field of Classification Search
CPC ........ B60G 11/24; B60G 7/001; B60G 7/008; B60G 2202/14; B60G 2206/7101; B60G 2206/72
See application file for complete search history.

(56) References Cited

U.S. PATENT DOCUMENTS

2019/0077206 A1* 3/2019 Pavesio .............. B60G 7/02

FOREIGN PATENT DOCUMENTS

| KR | 20220157074 A | * | 5/2021 |
| KR | 10-2022-0157074 A | | 11/2022 |

OTHER PUBLICATIONS

Translation of KR-20220157074-A.*

* cited by examiner

*Primary Examiner* — Paul N Dickson
*Assistant Examiner* — Shams Dhanani
(74) *Attorney, Agent, or Firm* — NSIP Law

(57) ABSTRACT

A suspension for a vehicle includes a lower arm part, an elastically deformable elastic part mounted over the lower arm part, a vehicle body part mounted over the elastic part, a first pad part interposed between the lower arm part and the elastic part and including an elastically deformable material, and a second pad part interposed between the elastic part and the vehicle body part and including an elastically deformable material.

12 Claims, 7 Drawing Sheets

SUSPENSION FOR VEHICLE

CROSS-REFERENCE TO RELATED APPLICATION

This application claims priority from and the benefit under 35 USC § 119 of Korean Patent Application No. 10-2024-0025359, filed on Feb. 21, 2024, in the Korean Intellectual Property Office, the entire disclosure of which is incorporated by reference for all purposes.

BACKGROUND

Field

Exemplary embodiments of the present disclosure relate to a suspension for a vehicle, and more particularly, to a suspension for a vehicle, which can reduce the weight of a vehicle by an elastic part including a composite material and may be applied to a narrow space.

Description of the Related Art

In a conventional technology, in a suspension for a vehicle, a coil spring made of a steel material is applied to a chassis module for a rear wheel.

The outer diameter of the coil spring made of the steel material needs to be increased in order to withstand a heavier weight as the weight of a vehicle is increased. A problem of interference with surrounding parts due the coil spring having an increased outer diameter may occur.

Furthermore, the coil spring made of the steel material has problems in that the steel of the coil spring has a heavier weight than another lightweight material due to the nature of the material and it is difficult to use the coil spring in a narrow space. Accordingly, there is a need to improve the problems.

The BACKGROUND of the present disclosure is disclosed in Korean Patent Application Publication No. 10-2022-0157074 (Nov. 29, 2022 entitled "SPRING LINK OF SUSPENSION FOR VEHICLE").

SUMMARY

Various embodiments are directed to a suspension for a vehicle, which can reduce the weight of a vehicle by an elastic part including a composite material and may be applied to a narrow space.

In an embodiment, a suspension for a vehicle includes a lower arm part, an elastically deformable elastic part mounted over the lower arm part, a vehicle body part mounted over the elastic part, a first pad part interposed between the lower arm part and the elastic part and including an elastically deformable material, and a second pad part interposed between the elastic part and the vehicle body part and including an elastically deformable material.

The elastic part may include a first elastic fixing part mounted on the first pad part, a second elastic fixing part spaced apart from the first elastic fixing part and having the second pad part mounted thereon, and an elastically deformable folding part having a first side connected to the first elastic fixing part and a second side connected to the second elastic fixing part.

The folding part may be folded at least once.

The folding part may include a folding body part disposed between the first elastic fixing part and the second elastic fixing part in a plural number so that the plurality of folding body parts is spaced apart from each other, a folding connection part configured to connect the first elastic fixing part to the the folding body part, or to connect the second elastic fixing part to the folding body part, and a composite material part mounted on the folding body part and including a composite material.

The folding body part may include a folding plate part disposed between the first elastic fixing part and the second elastic fixing part in a plural number so that the plurality of folding plate parts is spaced apart from each other and a folding hole part formed in the folding plate part so that the folding hole part penetrates the folding plate part.

The folding hole part may be arranged in a plural number in a width direction of the folding plate part.

The composite material part may include a composite material body part mounted on one surface of the folding body part and a composite material side part configured to extend from the composite material body part and to surround sides of the folding body part.

The folding connection part may have a curved shape in which the folding connection part protrudes to an outside of the folding body part.

The folding body part and the folding connection part may each be made of a steel material. The composite material part may be made of a glass fiber reinforced plastic (GFRP) material.

The first pad part may include a first pad body part seated in the lower arm part, one or more first pad protrusion parts formed in a first surface of the first pad body part and inserted into one or more lower arm groove parts of the lower arm part, respectively, and a first pad burring part formed on the second surface of the first pad body part, configured to surround a lower arm protrusion part of the lower arm part, and inserted into the elastic part.

The second pad part may include a second pad body part configured to come into contact with the vehicle body part and a second pad burring part formed on one surface of the second pad body part, configured to surround a vehicle body protrusion part of the vehicle body part, and inserted into the elastic part.

According to the suspension for a vehicle according to an embodiment of the present disclosure, it is possible to reduce the weight of a vehicle while reducing the vibration of the vehicle because the elastic part is elastically deformable and can be made lightweight.

Furthermore, according to an embodiment of the present disclosure, it is possible to secure a gap with a surrounding part while maintaining stiffness because the elastic part includes a steel material and the composite material.

DETAILED DESCRIPTION

Figure 1:
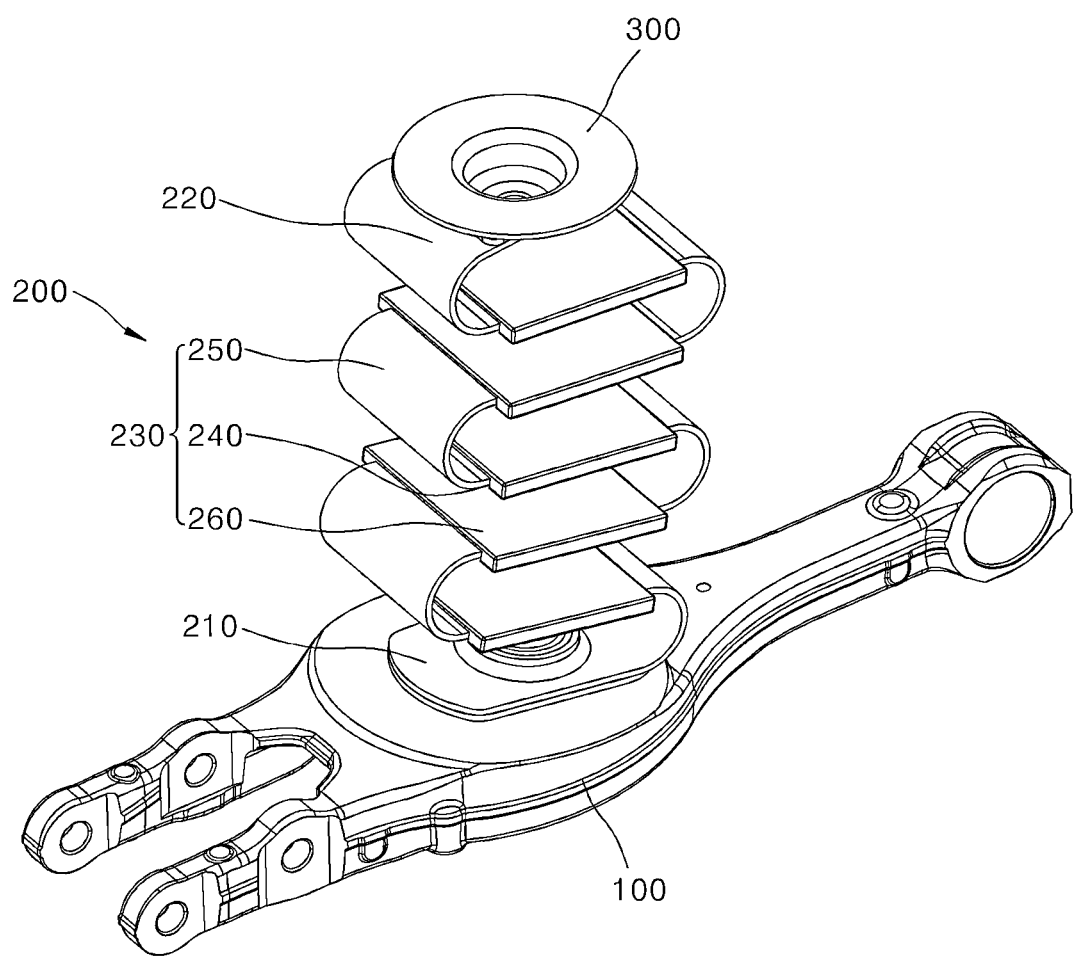
FIG. 1 is a perspective view schematically illustrating a suspension for a vehicle according to an embodiment of the present disclosure.

Hereinafter, a suspension for a vehicle according to embodiments of the present disclosure is described with reference to the accompanying drawings. In this process, the thicknesses of lines or the sizes of components illustrated in the drawings may have been exaggerated for the clarity of a description and for convenience' sake.

Furthermore, terms to be described below have been defined by taking into consideration their functions in the present disclosure, and may be changed depending on a user or operator's intention or practice. Accordingly, such terms should be defined based on the overall contents of this specification.

Figure 2:
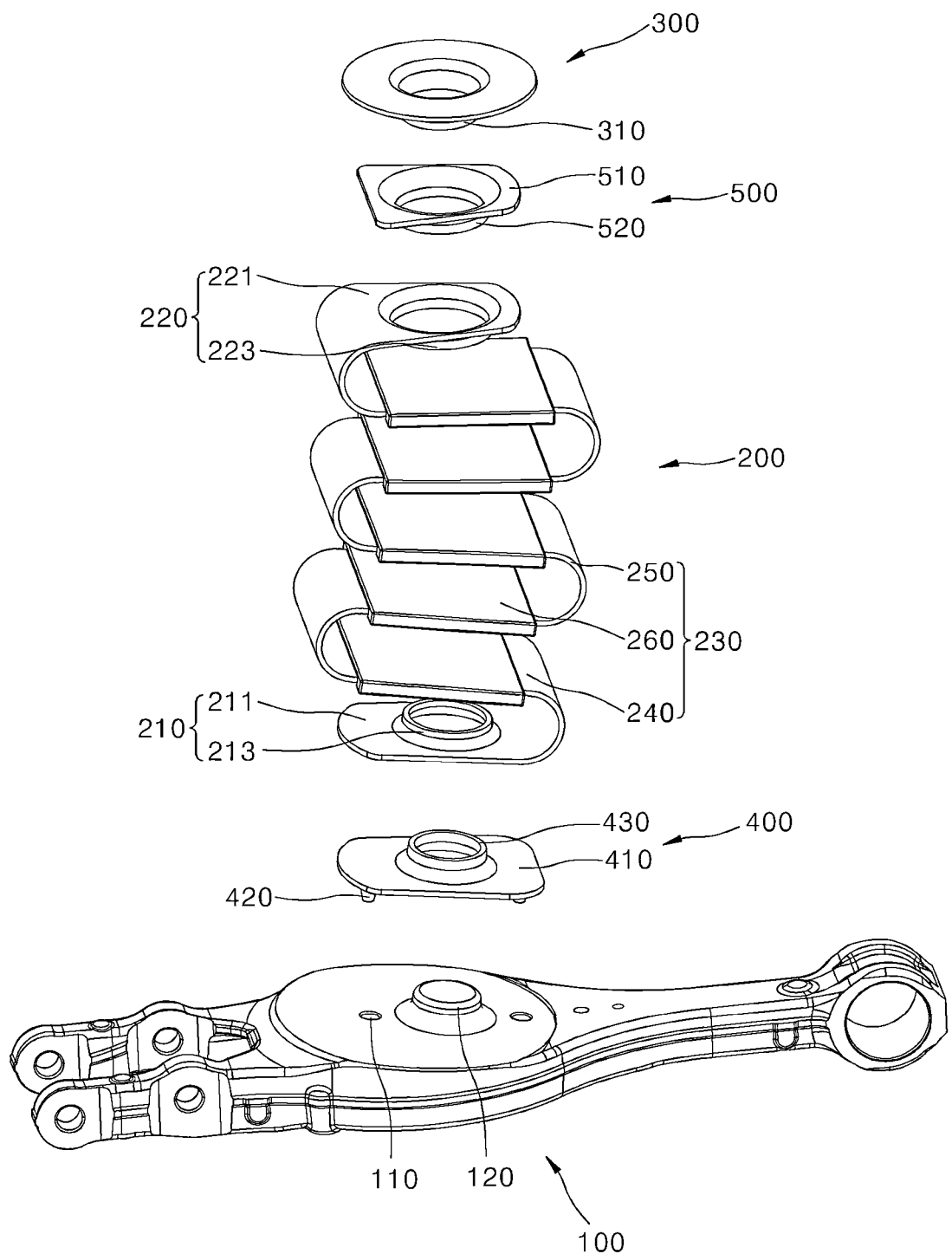
FIG. 2 is an assembly-perspective view schematically illustrating the suspension for a vehicle according to an embodiment of the present disclosure.
Figure 3:
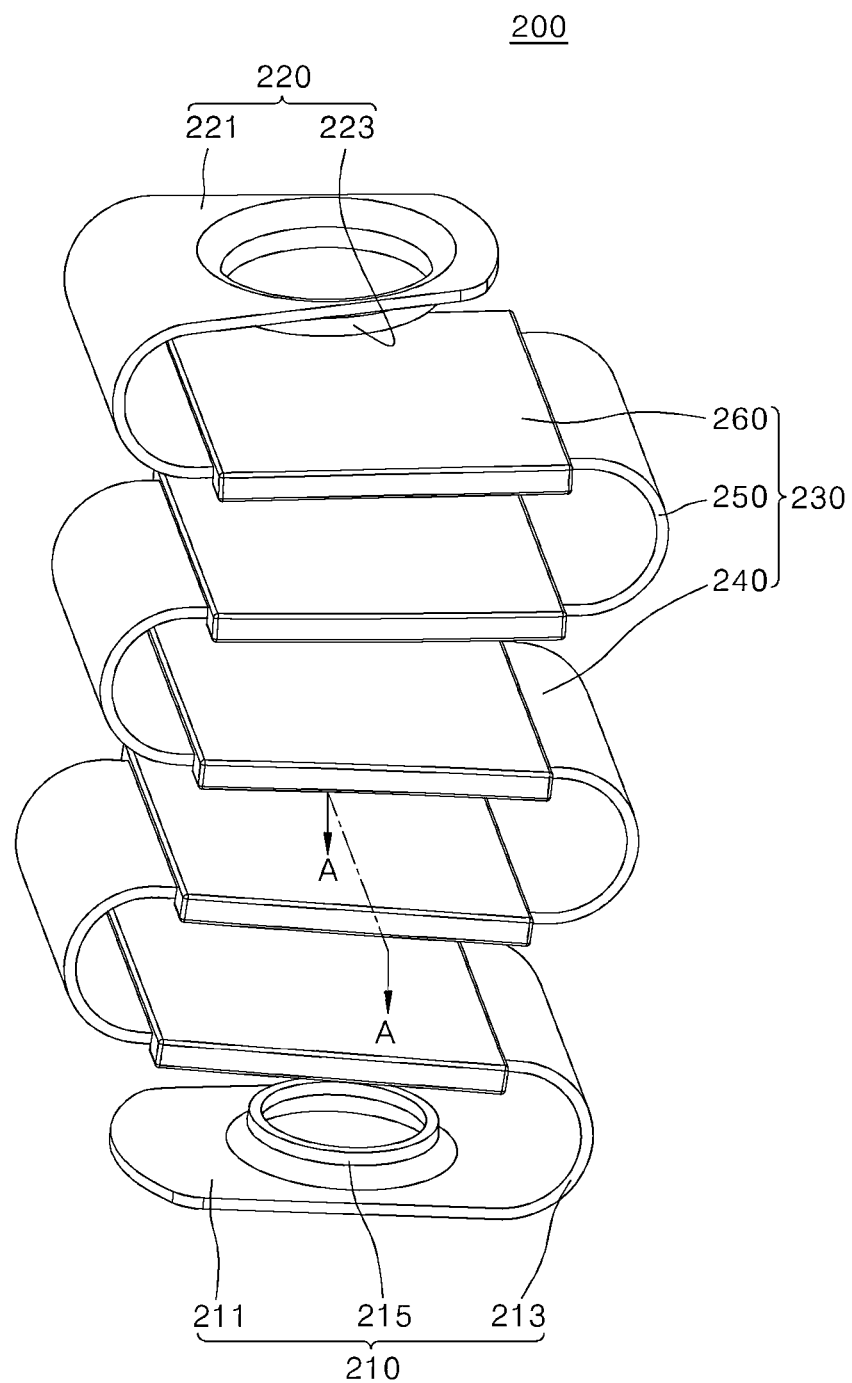
FIG. 3 is a perspective view schematically illustrating an elastic part according to an embodiment of the present disclosure.
Figure 4:
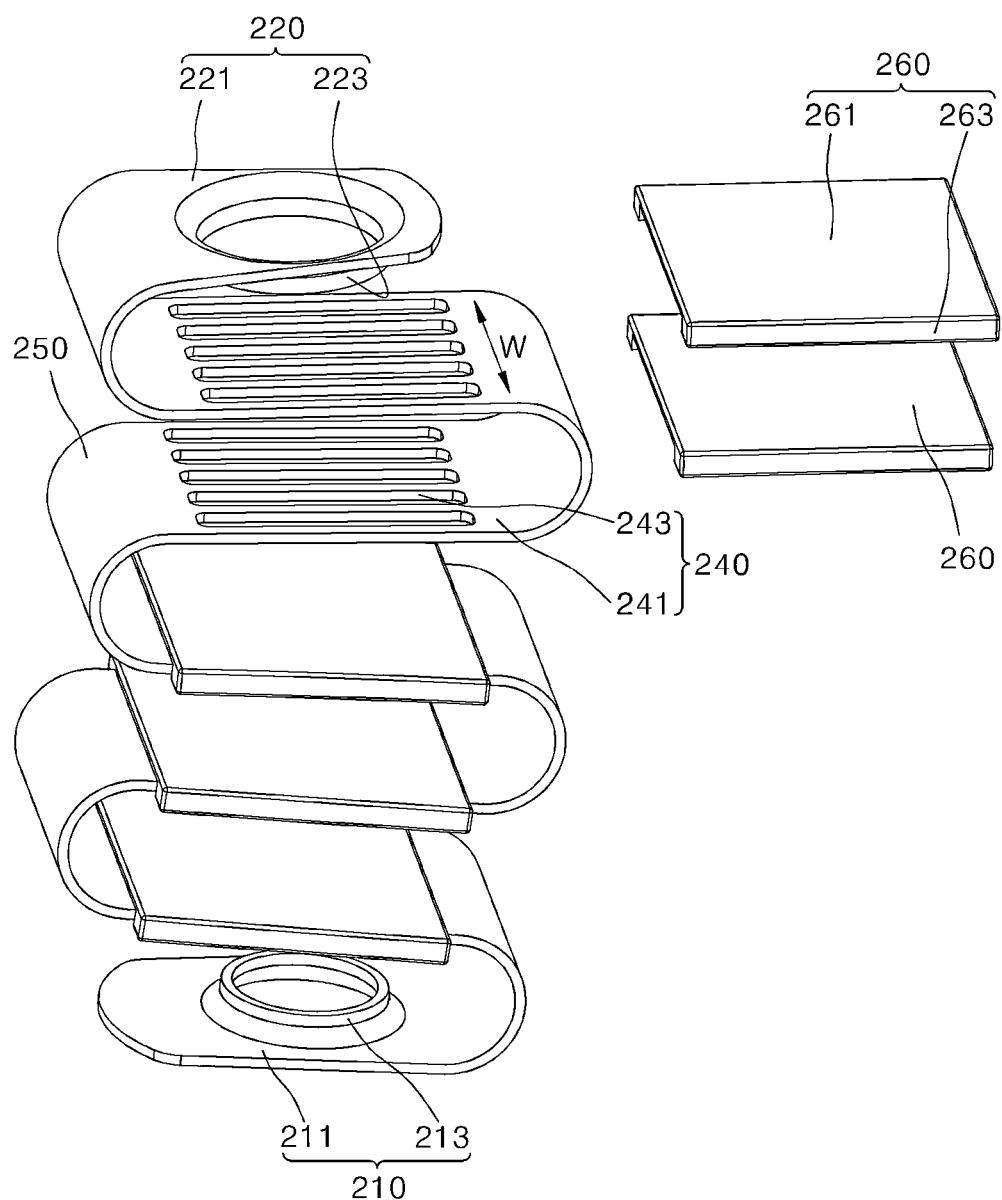
FIG. 4 is an assembly-perspective view schematically illustrating the elastic part according to an embodiment of the present disclosure.
Figure 5:
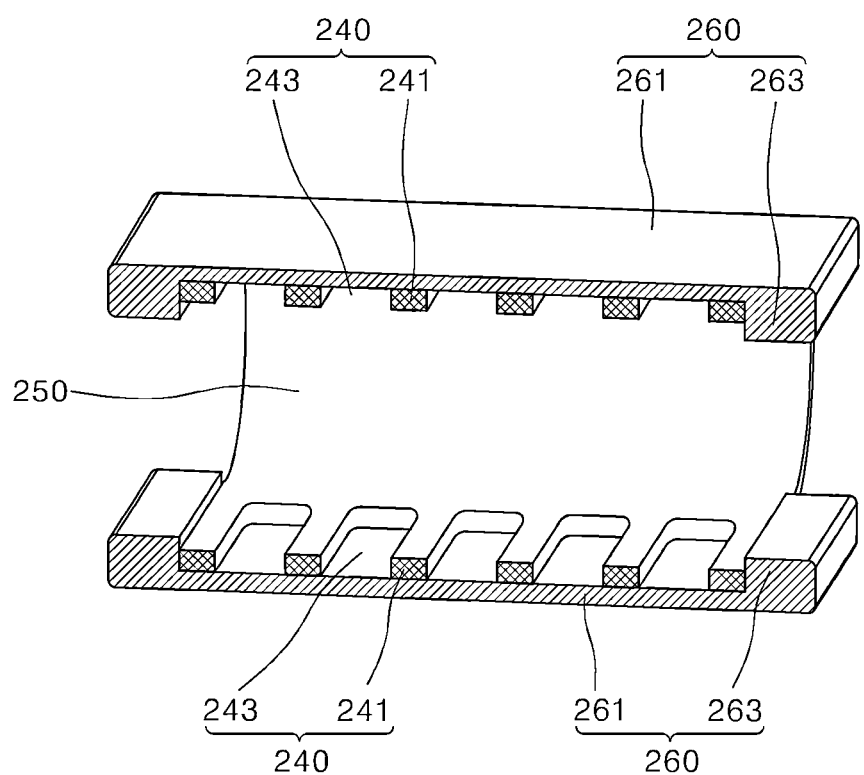
FIG. 5 is a schematic cross-sectional view taken along line A-A in FIG. 3.
Figure 6:
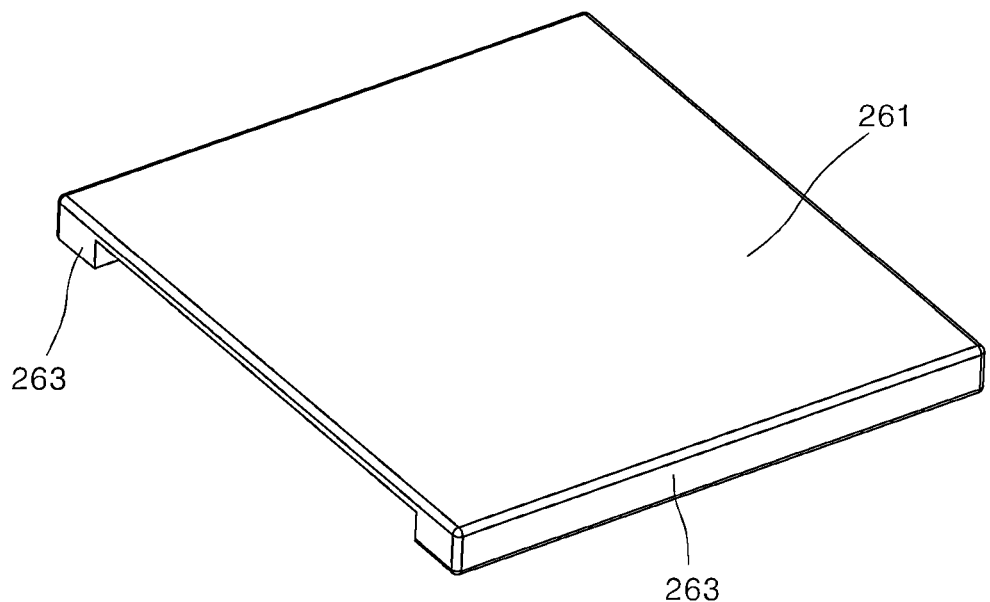
FIG. 6 is a perspective view schematically illustrating a composite material part according to an embodiment of the present disclosure.
Figure 7:
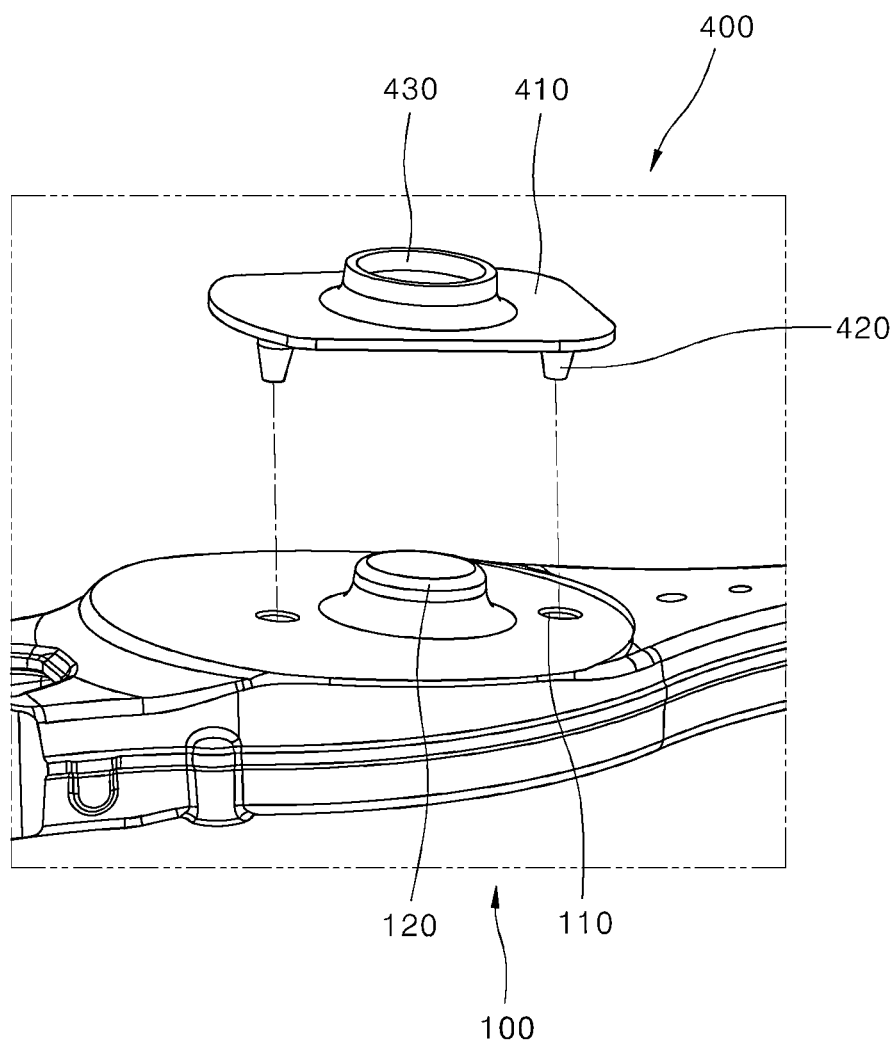
FIG. 7 is an assembly-perspective view schematically illustrating a lower arm part and a first pad part according to an embodiment of the present disclosure.

FIG. 1 is a perspective view schematically illustrating a suspension for a vehicle according to an embodiment of the present disclosure. FIG. 2 is an assembly-perspective view schematically illustrating the suspension for a vehicle according to an embodiment of the present disclosure. FIG. 3 is a perspective view schematically illustrating an elastic part according to an embodiment of the present disclosure. FIG. 4 is an assembly-perspective view schematically illustrating the elastic part according to an embodiment of the present disclosure. FIG. 5 is a schematic cross-sectional view taken along line A-A in FIG. 3. FIG. 6 is a perspective view schematically illustrating a composite material part according to an embodiment of the present disclosure. FIG. 7 is an assembly-perspective view schematically illustrating a lower arm part and a first pad part according to an embodiment of the present disclosure.

Referring to FIGS. 1 to 7, the suspension for a vehicle according to an embodiment of the present disclosure may include a lower arm part 100, an elastic part 200, a vehicle body part 300, a first pad part 400, and a second pad part 500.

The lower arm part 100 may mean an arm that is disposed on the lower side of a vehicle. The lower arm part 100 may be connected to a cross member by a steering knuckle. In an embodiment of the present disclosure, the lower arm part 100 may be applied to a chassis module for a rear wheel of the vehicle.

The elastic part 200 is mounted over (e.g., in FIGS. 1 and 2) the lower arm part 100, and may be elastically deformable. The elastic part 200 can reduce an impact on the vehicle by being elastically deformed.

The vehicle body part 300 may be mounted over (e.g., in FIGS. 1 and 2) the elastic part 200. The vehicle body part 300 may form the frame of the vehicle.

The first pad part 400 is interposed between the lower arm part 100 and the elastic part 200, and may include an elastically deformable material. The first pad part 400 may include rubber, silicon, or urethane as the elastically deformable material.

The second pad part 500 is interposed between the elastic part 200 and the vehicle body part 300, and may include an elastically deformable material. The second pad part 500 may include rubber, silicon, or urethane as the elastically deformable material.

The elastic part 200 may include a first elastic fixing part 210, a second elastic fixing part 220, and a folding part 230.

The first elastic fixing part 210 may be mounted on the first pad part 400. The first elastic fixing part 210 may be supported and fixed by the first pad part 400.

The first elastic fixing part 210 may include a first elastic fixing body part 211 and a first elastic burring part 213. The first elastic fixing body part 211 may be formed of a flat plate through which a central part is penetrated. The first elastic fixing body part 211 may be seated in a first pad body part 410 of the first pad part 400.

The first elastic fixing body part 211 may be connected to a folding body part 240 that neighbors the first elastic fixing body part 211 on the upper side thereof, by a folding connection part 250.

The first elastic burring part 213 may be formed to protrude toward the folding body part 240 of the folding part 230 that neighbors an upper side (e.g., in FIG. 2) of the first elastic fixing body part 211 that is formed to be penetrated, by burring processing. The first elastic burring part 213 may surround the outside of a first pad burring part 430 of the first pad part 400.

The second elastic fixing part 220 is spaced apart from the first elastic fixing part 210. The second pad part 500 may be mounted on the second elastic fixing part 220. The second elastic fixing part 220 may be disposed over (e.g., in FIG. 2) the first elastic fixing part 210 by being spaced apart from the first elastic fixing part 210. The second pad part 500 may be supported and fixed to the second elastic fixing part 220.

A second elastic fixing body part 221 may be connected to the folding body part 240 that neighbors the second elastic fixing body part 221 on the lower side thereof, by the folding connection part 250.

The second elastic fixing part 220 may include the second elastic fixing body part 221 and a second elastic burring part 223. The second elastic fixing body part 221 may be formed of a flat plate the central part of which is formed to be penetrated. A second pad body part 510 of the second pad part 500 may be seated in the second elastic fixing body part 221.

The second elastic burring part 223 may be formed to protrude toward the folding body part 240 of the folding part 230 that neighbors a lower side (e.g., in FIG. 2) of the second elastic fixing body part 221 that is formed to be penetrated, by burring processing. The second elastic burring part 223 may surround the outside of the second pad burring part 520 of the second pad part 500.

The folding part 230 has one side (i.e., a lower side of the folding part 230 in FIG. 2) connected to the first elastic fixing part 210 and the other side (i.e., an upper side of the folding part 230 in FIG. 2) connected to the second elastic fixing part 220. The folding part 230 may be folded at least once and elastically deformable.

The folding part 230 may be formed to be folded at least once, that is, bent several times in a zigzag form. The folding part 230 is formed to be folded at least once, and may be elastically deformed in up and down directions (e.g., in FIG. 2). The folding part 230 can reduce an impact on the vehicle by being elastically deformed in the up and down directions.

The folding part 230 may include the folding body part 240, the folding connection part 250, and a composite material part 260. The folding body part 240 may be disposed between the first elastic fixing part 210 and the second elastic fixing part 220 in a plural number so that the plurality of folding body parts 240 is spaced apart from each other. The plurality of folding body parts 240 may be connected by the folding connection part 250.

The folding body part 240 may include a folding plate part 241 and a folding hole part 243. The folding plate part 241 may be disposed between the first elastic fixing part 210 and the second elastic fixing part 220 in a plural number so that the plurality of folding plate parts 241 is spaced apart from each other. The folding plate part 241 may be formed of a flat plate that is disposed between the first elastic fixing part 210 and the second elastic fixing part 220 in a plural number.

The composite material part 260 may be seated in the folding plate part 241. The composite material part 260 may be simply held in the folding plate part 241 or may be coupled to the folding plate part 241 so that the composite material part 260 is firmly fixed to the folding plate part 241. Alternatively, the composite material part 260 may be molded and combined with the folding plate part 241.

Referring to FIG. 4, the folding hole part 243 may be formed in the folding plate part 241 so that the folding hole part 243 penetrates the folding plate part 241. The folding hole part 243 may be formed in a long hole shape in the length direction (i.e., a horizontal direction in FIG. 4) of the folding plate part 241 so that the folding hole part 243 penetrates the folding plate part 241. The folding hole part 243 is formed in the folding plate part 241 so that the folding hole part 243 penetrates the folding plate part 241, and thus can increase the strength of the folding body part 240, compared to a solid shape having the same weight, while reducing the weight of the folding body part 240.

The folding hole part 243 may be arranged in a plural number in the width direction (i.e., a direction W in FIG. 4) of the folding plate part 241. The plurality of folding hole parts 243 is formed in the width direction of the folding plate part 241 so that the plurality of folding hole parts 243 penetrates the folding plate part 241, and thus can prevent the occurrence of deformation, such as twisting, in a specific portion while reducing the weight of the folding body part 240.

The folding connection part 250 may connect the first elastic fixing part 210, the folding body part 240, or the second elastic fixing part 220 to the folding body part 240 that neighbors thereto. The folding connection part 250 may be consecutively formed in the first elastic fixing part 210, the folding body part 240, or the second elastic fixing part 220.

That is, the folding connection part 250 may connect the first elastic fixing part 210, and the folding body part 240 that neighbors the upper side of the first elastic fixing part 210. Alternatively, the folding connection part 250 may connect the folding body part 240, and the second elastic fixing part 220 and the first elastic fixing part 210 that neighbor the upper and lower sides of the folding body part 240. Alternatively, the folding connection part 250 may connect the second elastic fixing part 220, and the folding body part 240 that neighbors the lower side of the second elastic fixing part 220.

The folding connection part 250 may provide an elastic force to the first elastic fixing part 210, the folding body part 240, or the second elastic fixing part 220, which has an interval therebetween narrowed or widened in up and down directions thereof, by connecting the first elastic fixing part 210, the folding body part 240, or the second elastic fixing part 220 to the folding body part 240 that neighbors the first elastic fixing part 210 or the second elastic fixing part 220.

The folding connection part 250 may be in a curved shape in which the folding connection part 250 protrudes to the outside of the folding body part 240. The folding connection part 250 is formed in a curved shape at the end of the folding body part 240, and thus can prevent the folding body part 240 from being damaged due to stress in addition to an elastic force.

The folding connection part 250 may be alternately disposed on the left side and right side thereof at the end of the folding body part 240 in up and down directions thereof.

The composite material part 260 is mounted on the folding body part 240, and may include a composite material. The composite material part 260 may be formed in a size capable of covering the folding hole part 243 of the folding body part 240. The composite material part 260 can reduce stress that is applied to the folding body part 240, by covering the folding hole part 243 that is formed to be penetrated.

The composite material part 260 may be mounted on the folding body part 240 by prepreg compression molding (PCM).

The composite material part 260 may include a composite material body part 261 and a composite material side part 263. The composite material body part 261 may be mounted on one surface (i.e., an upper side of the folding body part 240 in FIG. 4) of the folding body part 240.

The composite material side part 263 may extend from both sides of the composite material body part 261 and surround the sides of the folding body part 240. The composite material side part 263 can prevent the folding body part 240 from breaking away in the width direction (i.e., the direction W in FIG. 4) of the folding body part 240 by surrounding the sides of the folding body part 240.

The folding body part 240 and the folding connection part 250 each include a steel material. The composite material part 260 may include a glass fiber reinforced plastic (GFRP) material.

The folding body part 240 and the folding connection part 250 each include the steel material and can maintain predetermined stiffness. The composite material part 260 includes the GFRP material as a composite material, and thus can reduce stress that is applied to the folding hole part 243 of the folding body part 240 while reducing the weight of the folding body part 240 compared to a case in which the composite material part 260 is made of a steel material.

The first pad part 400 may include the first pad body part 410, one or more first pad protrusion parts 420, and the first pad burring part 430. The first pad body part 410 may be seated in one surface (i.e., an upper side of the lower arm part 100 in FIGS. 2 and 7) of the lower arm part 100. The first pad body part 410 includes an elastically deformable material, and may be elastically deformed while coming into contact with the lower arm part 100 and the first elastic fixing part 210 of the elastic part 200.

The first pad protrusion parts 420 may be formed on first surface (i.e., a lower side of the first pad body part 410 in FIGS. 2 and 7) of the first pad body part 410 so that the first pad protrusion parts 420 protrude from the first pad body part 410, and may be inserted into lower arm groove parts 110 of the lower arm part 100, respectively. The first pad protrusion parts 420 each include an elastically deformable material, and may be elastically deformed while being inserted into the lower arm groove parts 110 of the lower arm part 100.

The lower arm groove part 110 of the lower arm part 100 into which the first pad protrusion part 420 is inserted may be concavely formed. The lower arm groove part 110 may be formed to have a size and number corresponding to the size and number of the first pad protrusion part 420.

The first pad burring part 430 may be formed on second surface of (i.e., an upper side of the first pad body part 410 in FIGS. 2 and 7) of the first pad body part 410 so that the first pad burring part 430 protrudes from the first pad body part 410. The first pad burring part 430 may surround the lower arm protrusion part 120 of the lower arm part 100 and may be inserted into the elastic part 200. A lower arm protrusion part 120 may be formed at the central part of the lower arm part 100 so that the lower arm protrusion part 120 protrudes from the lower arm part 100.

The first pad burring part 430 surrounds the outside of the lower arm protrusion part 120, and may be inserted into the first elastic burring part 213 of the first elastic fixing part 210 of the elastic part 200. The first pad burring part 430 includes an elastically deformable material, and may be elastically deformed between the lower arm protrusion part 120 and the first elastic burring part 213.

The second pad part 500 may include the second pad body part 510 and a second pad burring part 520. The second pad body part 510 may come into contact with one surface (i.e., a lower side of the vehicle body part 300 in FIG. 2) of the vehicle body part 300. The second pad body part 510 includes an elastically deformable material, and may be elastically deformed while coming into contact with the vehicle body part 300 and the second elastic fixing part 220 of the elastic part 200.

The second pad burring part 520 may be formed on one surface (i.e., a lower side of the second pad body part 510 in FIG. 2) of the second pad body part 510 so that the second pad burring part 520 protrudes from the second pad body part 510. The second pad burring part 520 surrounds the vehicle body protrusion part 310 of the vehicle body part 300, and may be inserted into the elastic part 200. A vehicle body protrusion part 310 may be formed at the central part of the vehicle body part 300 so that the vehicle body protrusion part 310 protrudes from the vehicle body part 300.

The second pad burring part 520 surrounds the outside of the vehicle body protrusion part 310, and may be inserted into the second elastic burring part 223 of the second elastic fixing part 220 of the elastic part 200. The second pad burring part 520 includes an elastically deformable material, and may be elastically deformed between the vehicle body protrusion part 310 and the second elastic burring part 223.

An assembly process of the suspension for a vehicle, which has the aforementioned construction, according to an embodiment of the present disclosure is described below.

The first pad protrusion parts 420 of the first pad part 400 may be inserted into the lower arm groove parts 110 of the lower arm part 100. The first pad burring part 430 of the first pad part 400 may surround the outside of the lower arm protrusion part 120 of the lower arm part 100.

The second pad burring part 520 of the second pad part 500 may surround the side of the vehicle body protrusion part 310 of the vehicle body part 300.

The first elastic fixing part 210 and second elastic fixing part 220 of the elastic part 200 may come into contact with the first pad part 400 and the second pad part 500, respectively.

The first pad burring part 430 of the first pad part 400 may be inserted and mounted on the first elastic burring part 213 of the first elastic fixing part 210.

The second pad burring part 520 of the second pad part 500 may be inserted and mounted on the second elastic burring part 223 of the second elastic fixing part 220.

The suspension for a vehicle, which has been assembled through the aforementioned process, can reduce an impact on a vehicle as the folding part 230 of the elastic part 200 is elastically deformed up and down when the vehicle travels.

According to the suspension for a vehicle according to an embodiment of the present disclosure, the weight of a vehicle can be reduced while the vibration of the vehicle is reduced because the elastic part 200 can be elastically deformed and reduced in weight.

Furthermore, according to an embodiment of the present disclosure, a gap between the elastic part 200 and a surrounding part can be secured while the stiffness of the elastic part 200 is maintained because the elastic part 200 includes the steel material and the composite material.

Although specific embodiments of the present disclosure have been described above, the spirit and range of the present disclosure is not limited to the specific embodiments. A person having ordinary knowledge in the art to which the present disclosure pertains may modify and change the present disclosure without departing from the gist of the present disclosure written in the claims.

What is claimed is:

1. A suspension for a vehicle, comprising:
a lower arm part;
an elastically deformable elastic part mounted over the lower arm part;
a vehicle body part mounted over the elastic part;
a first pad part interposed between the lower arm part and the elastic part and comprising an elastically deformable material; and
a second pad part interposed between the elastic part and the vehicle body part and comprising an elastically deformable material,
wherein the elastic part comprises:
a first elastic fixing part mounted on the first pad part;
a second elastic fixing part spaced apart from the first elastic fixing part and having the second pad part mounted thereon; and
an elastically deformable folding part having a first side connected to the first elastic fixing part and a second side connected to the second elastic fixing part.

2. The suspension of claim 1, wherein the folding part is folded at least once.

3. The suspension of claim 2, wherein the folding part comprises:
a folding body part disposed between the first elastic fixing part and the second elastic fixing part in a plural number so that the plurality of folding body parts is spaced apart from each other;
a folding connection part configured to connect the first elastic fixing part to the folding body part, or to connect the second elastic fixing part to the folding body part; and
a composite material part mounted on the folding body part and comprising a composite material.

4. The suspension of claim 3, wherein the folding body part comprises:
a folding plate part disposed between the first elastic fixing part and the second elastic fixing part in a plural number so that the plurality of folding plate parts is spaced apart from each other; and
a folding hole part formed in the folding plate part so that the folding hole part penetrates the folding plate part.

5. The suspension of claim 4, wherein the folding hole part is arranged in a plural number in a width direction of the folding plate part.

6. The suspension of claim 3, wherein the composite material part comprises:
a composite material body part mounted on one surface of the folding body part; and
a composite material side part configured to extend from the composite material body part to surround sides of the folding body part.

7. The suspension of claim 3, wherein the folding connection part has a curved shape in which the folding connection part protrudes to an outside of the folding body part.

8. The suspension of claim 3, wherein:
the folding body part and the folding connection part are each made of a steel material, and
the composite material part is made of a glass fiber reinforced plastic (GFRP) material.

9. The suspension of claim 1, wherein the first pad part comprises:
a first pad body part seated in the lower arm part;
one or more first pad protrusion parts formed in a first surface of the first pad body part and inserted into one or more lower arm groove parts of the lower arm part, respectively; and
a first pad burring part formed on a second surface of the first pad body part, configured to surround a lower arm protrusion part of the lower arm part, and inserted into the elastic part.

10. The suspension of claim 1, wherein the second pad part comprises:
a second pad body part configured to come into contact with the vehicle body part; and
a second pad burring part formed on one surface of the second pad body part, configured to surround a vehicle body protrusion part of the vehicle body part, and inserted into the elastic part.

11. A suspension for a vehicle, comprising:
a lower arm part;
an elastically deformable elastic part mounted over the lower arm part;
a vehicle body part mounted over the elastic part;
a first pad part interposed between the lower arm part and the elastic part and comprising an elastically deformable material; and
a second pad part interposed between the elastic part and the vehicle body part and comprising an elastically deformable material,
wherein the first pad part comprises:
a first pad body part seated in the lower arm part;
one or more first pad protrusion parts formed in a first surface of the first pad body part and inserted into one or more lower arm groove parts of the lower arm part, respectively; and
a first pad burring part formed on a second surface of the first pad body part, configured to surround a lower arm protrusion part of the lower arm part, and inserted into the elastic part.

12. A suspension for a vehicle, comprising:
a lower arm part;
an elastically deformable elastic part mounted over the lower arm part;
a vehicle body part mounted over the elastic part;
a first pad part interposed between the lower arm part and the elastic part and comprising an elastically deformable material; and
a second pad part interposed between the elastic part and the vehicle body part and comprising an elastically deformable material,
wherein the second pad part comprises:
a second pad body part configured to come into contact with the vehicle body part; and
a second pad burring part formed on one surface of the second pad body part, configured to surround a vehicle body protrusion part of the vehicle body part, and inserted into the elastic part.

* * * * *